United States Patent
Galmiche et al.

(10) Patent No.: US 11,303,173 B2
(45) Date of Patent: Apr. 12, 2022

(54) ROTOR FOR ASYNCHRONOUS ELECTRICAL MACHINE WITH NON-THROUGH SHAFT

(71) Applicant: GE Energy Power Conversion Technology Limited, Warwickshire (GB)

(72) Inventors: Christophe Galmiche, Toul (FR); Remy Muller, Belfort (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 192 days.

(21) Appl. No.: 16/575,333

(22) Filed: Sep. 18, 2019

(65) Prior Publication Data

US 2020/0112215 A1 Apr. 9, 2020

(51) Int. Cl.
*H02K 1/30* (2006.01)
*H02K 17/16* (2006.01)

(52) U.S. Cl.
CPC ............. *H02K 1/30* (2013.01); *H02K 17/165* (2013.01)

(58) Field of Classification Search
CPC ........ H02K 1/30; H02K 17/165; H02K 17/16; H02K 5/12; H02K 15/0012; H02K 1/28; H02K 3/44; H02K 1/22
See application file for complete search history.

(56) References Cited

U.S. PATENT DOCUMENTS

| 5,512,792 A * | 4/1996 | Bawin ...................... H02K 1/28 310/211 |
| 2018/0026505 A1* | 1/2018 | Galmiche ............ H02K 17/165 310/211 |

FOREIGN PATENT DOCUMENTS

WO    WO-2010052226 A1 *    5/2010    ......... H02K 15/0012

OTHER PUBLICATIONS

Machine Translation, Manegold, WO-2010052226-A1, May 2010. (Year: 2010).*

* cited by examiner

*Primary Examiner* — Thomas Truong
(74) *Attorney, Agent, or Firm* — Wood IP LLC

(57) ABSTRACT

Provided is a rotor for an asynchronous rotating electrical machine that includes a cylindrical magnetic mass, two short-circuit disks, a non-through shaft that includes two half-shafts tightly holding the cylindrical magnetic mass and the two short-circuit disks each sandwiched between the half-shafts and one of the ends of the magnetic mass, and conducting bars housed inside the magnetic mass and distributed uniformly along at least one diameter of the magnetic mass such that the short-circuit disks and the conducting bars form a squirrel cage, and the half-shafts, the short-circuit disks and the magnetic mass form a gas-tight envelope.

17 Claims, 6 Drawing Sheets

ROTOR FOR ASYNCHRONOUS ELECTRICAL MACHINE WITH NON-THROUGH SHAFT

The present invention relates to squirrel-cage asynchronous rotating electrical machines and more specifically relates to a rotor comprising a non-through shaft used in a harsh environment, in particular in the presence of compressed corrosive gases.

This invention also relates to a rotating electrical machine comprising such a rotor.

An asynchronous rotating electrical machine may be used in a harsh environment such as an environment comprising aggressive chemical agents which could break down elements of the machine, such as a pressurized environment subject to large pressure variations, for example when the electrical machine is used and incorporated in a compressor unit.

In this application, the rotor is cooled by a compressed gas containing aggressive impurities and/or chemical components breaking down the insulating varnish between the magnetic sheets or the magnetic sheets themselves.

The document EP 0,609,645 describes a laminated rotor comprising a non-through shaft for a squirrel-cage asynchronous electrical motor.

Refer to FIG. 1 which shows a section of such a rotor 1 along an axial direction.

The rotor comprises two half-shafts 2 and 3 between which are inserted magnetic sheets 4 held compressed by tie rods 5 connecting the two half-shafts 2 and 3.

The magnetic sheets 4 form the magnetic mass of the rotor.

The rotor 1 comprises short-circuit crowns or disks 2a and 3a connecting conducting bars (not shown), for example copper, forming a squirrel cage.

Each magnetic sheet 4 comprises holes 4a in which are inserted the tie rods 5 and generally have a thickness included between one tenth of a millimeter and one millimeter.

Each sheet 4 is coated with a layer of insulating varnish 6 preventing electrical contact between adjacent sheets so as to minimize the losses from eddy currents and increase the efficiency of the motor.

However, in the compressor unit, the electrical machine is immersed in the gas handled by the compressor unit. This gas contains aggressive agents, such as acidic particles, which could break down the varnish layer and corrode or destroy the tie rods, the short-circuit disks and the copper bars as well as the iron-silicon magnetic sheets.

Further, during operation of the compressor unit at high pressures, for example 100 bars, gas penetrates inside the rotor between the sheets 4 and into the holes 4a.

When the compressor unit stops, a pressure differential is created between the inside of the rotor at a pressure of 100 bars and the inside of the compressor unit at atmospheric pressure, creating additional stresses on the tie rods, which could cause their breakdown and which could detach the sheets from each other under the effect of the residual pressure.

The document DE 19/956042 discloses a rotor with a non-through shaft for an asynchronous rotating electrical machine comprising a magnetic mask formed by a stack of sheets compacted between two half-shafts.

However, the sheets are partially hollowed in their center and are assembled to each other without sealing.

The hollow parts of the sheets of the rotor store the high-pressure gas during operation of the rotating electrical machine.

Upon stoppage of the electrical machine, a pressure differential created between the inside and outside of the rotor could break down this type of rotor.

Remedying the disadvantages of rotors for a squirrel-cage asynchronous rotating electrical machine according to the state-of-the-art is therefore proposed.

In light of the preceding, according to one aspect, a rotor is proposed for an asynchronous rotating electrical machine with non-through shaft comprising two half-shafts holding tightly a cylindrical magnetic mass and two short-circuit disks each sandwiched between the half-shafts and one of the ends of the magnetic mass, and conducting bars housed inside the magnetic mass and distributed uniformly along at least one diameter of the magnetic mass such that the short-circuit disks and the conducting bars form a squirrel cage.

The half-shafts, the short-circuit disks and the magnetic mass form a gas-tight envelope. In that way, gas is prevented from coming into contact with the conducting bars.

The breakdown of the rotor used in an aggressive chemical environment and subject to large pressure variations is therefore prevented or limited.

According to a characteristic, each end of the conducting bars is housed with play in a blind hole of a short-circuit disk.

According to a characteristic, each end of the conducting bars is housed with play in a through hole of a short-circuit disk.

According to a first embodiment, the magnetic mass comprises a unitary metal body comprising housings receiving the conducting bars.

Preferably, the rotor further comprises screws uniformly distributed along at least one diameter of the half-shaft, each screw being engaged in threads of the unitary metal body so as to keep the short-circuit disks and the unitary metal body compacted between the half-shafts, where each screw head is housed in a counterbore of the half-shaft comprising a circular groove at the bottom of the counterbore and where a seal is arranged in the circular groove such that the gas cannot come into contact with the threads.

Advantageously, at least one end of the metal body comprises a circular groove comprising a seal so as to form a tight contact between the metal body and the short-circuit disk.

According to another characteristic, the surface of the half-shaft in contact with the short-circuit disk comprises a circular groove comprising a seal so as to form a tight contact between the half-shaft and the short-circuit disk.

According to an embodiment, the magnetic mass comprises a stack of metal plates comprising housings receiving the conducting bars, where at least one surface of each metal plate comprises a circular groove comprising a seal so as to form a tight contact between the surfaces of the metal plates in contact.

Advantageously, the rotor further comprises tie rods uniformly distributed along at least one diameter of the rotor where the tie rods are inserted in the second housings of the metal plates, where a first end of the tie rods is engaged in a threaded blind hole of the first half-shaft and the second end of the tie rods is engaged with a cap nut arranged in a counterbore of the second half-shaft, where the second half-shaft comprises at the bottom of the counterbore a circular groove comprising a seal so as to keep the metal plates and the short-circuit disks compacted between the half-shafts and such that gas cannot come into contact with the tie rod.

Preferably, the surface of the half-shaft in contact with the short-circuit disk comprises a circular groove comprising a seal so as to form a tight contact between the half-shaft and the short-circuit disk.

According to an embodiment, at least one half-shaft comprises a circular counterbore, where the outer diameter of the short-circuit disk, the diameter of the counterbore and the inner and outer diameters of the end of the half-shaft directed towards the metal plate are sized such that the short-circuit disk goes into the circular counterbore and the end of the half-shaft goes into the circular groove of the metal plate such that the seal is compressed and the gas does not come into contact with the short-circuit disk.

According to an embodiment, the rotor further comprises a crown, where at least one half-shaft comprises a circular groove comprising a seal on the surface thereof in contact with the short-circuit disk, where the crown, circular groove of the half-shaft and the outer diameter of the short-circuit disk are sized such that the short-circuit disk goes into the circular groove of the half-shaft and into the circular groove of the metal plate comprising a seal such that the seals are compressed and that the gas does not come into contact with the short-circuit disk.

According to an embodiment, at least one half-shaft comprises a circular groove comprising a seal on the surface in contact with the short-circuit disk, where the metal plate comprises a circular counterbore on the surface in contact with the short-circuit disk, where the outer diameter of the short-circuit disk, the diameter of the counterbore and the inner and outer diameter of the end of the metal plate directed towards the half-shaft are sized such that the short-circuit disk goes into the circular counterbore and the end of the metal plate goes into the circular groove of the half-shaft such that the seal is compressed and that the gas does not come into contact with the short-circuit disk.

Preferably the seal comprises an O-ring made of stainless steel, polymer or metal, preferably a single piece without break or stubbing.

Advantageously the outer surface of the rotor comprises a coating comprising nickel or comprising a NiCrAlY type alloy or a MCrAlY type alloy or comprising a PEEK or PEEK-based polymer.

According to a characteristic, the metal body, the metal plates, the crown or the half-shafts comprise alloyed or martensitic steel, austenitic or martensitic stainless steel or even titanium.

Preferably at least one short-circuit disk comprises at least one surface comprising a circular groove receiving a seal so as to make the contact between the plate or the half-shaft and the short-circuit disk tight.

Advantageously, at least one half-shaft, one short-circuit disk, the metal body or one metal plate comprises at least one surface comprising two or more substantially concentric circular grooves, where each groove comprises a seal and where the seals are the same or different kind, so as to form several tight barriers of the same or different kind for improving the seal of the rotor.

Preferably at least one half-shaft, one short-circuit disk, the metal body or one metal plate comprises at least one surface comprising at least one circular groove and a seal substantially concentric to the conducting bar, the tie rod, the threading or the screw so as to improve the seal and chemical protection of the bars, tie rods and screws.

According to another aspect, an asynchronous rotating electrical machine comprising a rotor such as previously defined is proposed.

Other characteristics and advantages of the invention will emerge on reading the following description of the embodiments of the invention, provided solely by way of non-limiting examples and with reference to the diagrams where:

FIG. 1, which was already discussed, illustrates a rotor comprising a non-through shaft for an electric rotating machine according to the state-of-the-art;

Figure 1:
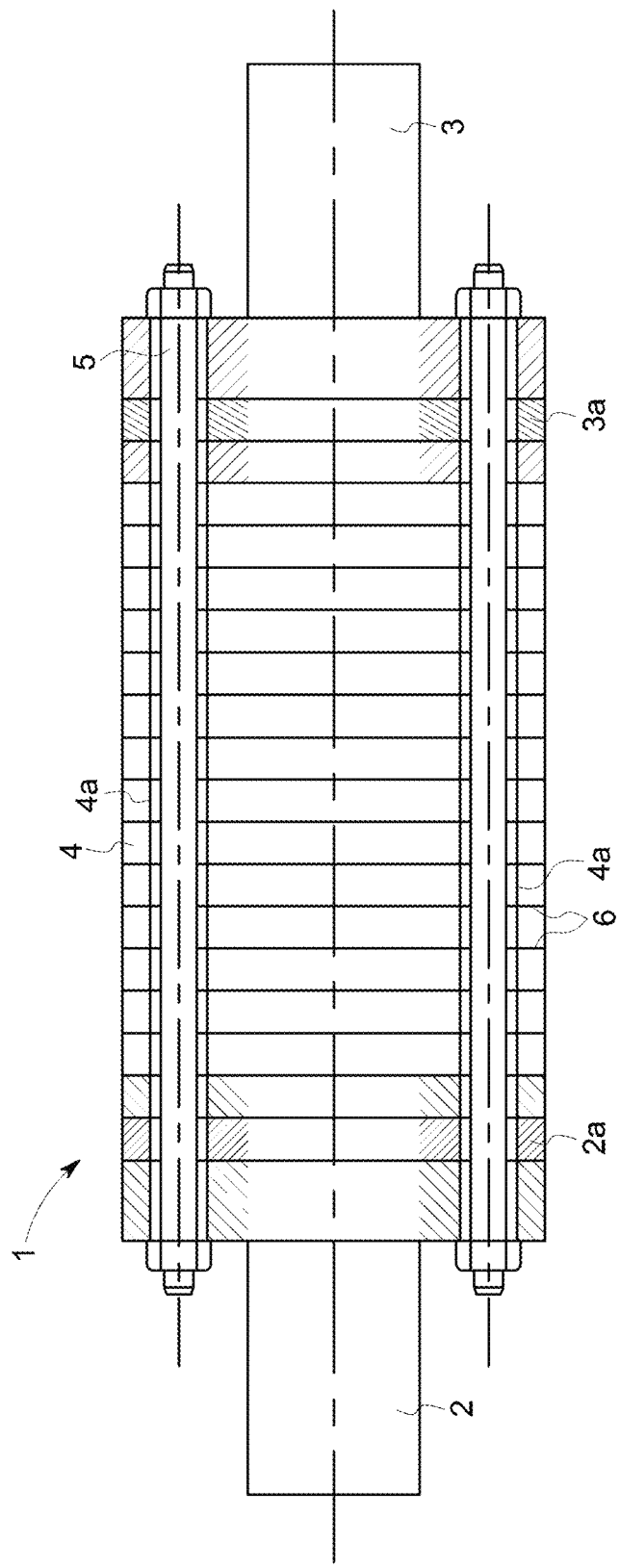
Figure 2:
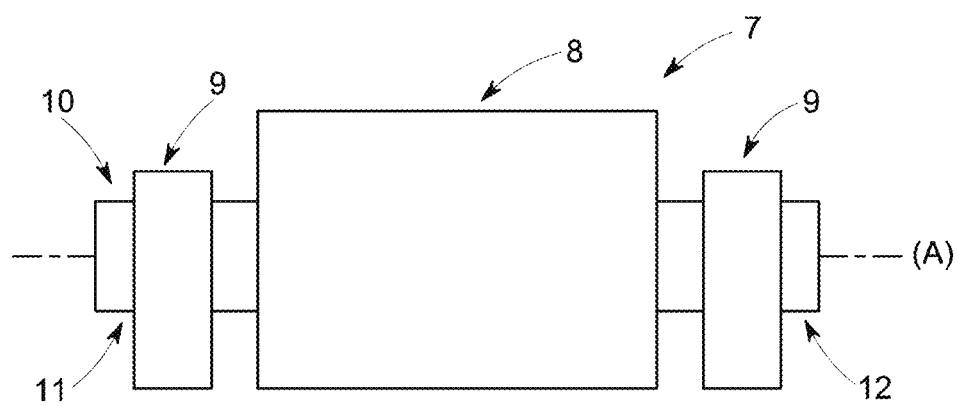
FIG. 2 illustrates an embodiment of an asynchronous rotating electrical machine.

Referring to FIG. 2, it shows an embodiment of an asynchronous rotating the electrical machine 7 comprising a stator 8, bearings 9 and a rotor 10 inserted into the stator 8 and the bearings 9.

The rotor 10 comprises a non-through rotary shaft made for example of steel with axis (A) coincident with the axis of rotation of the rotor 10.

The asynchronous rotating electrical machine 7 is for example incorporated in a compressor unit and is immersed in a corrosive gas.

Figure 3:
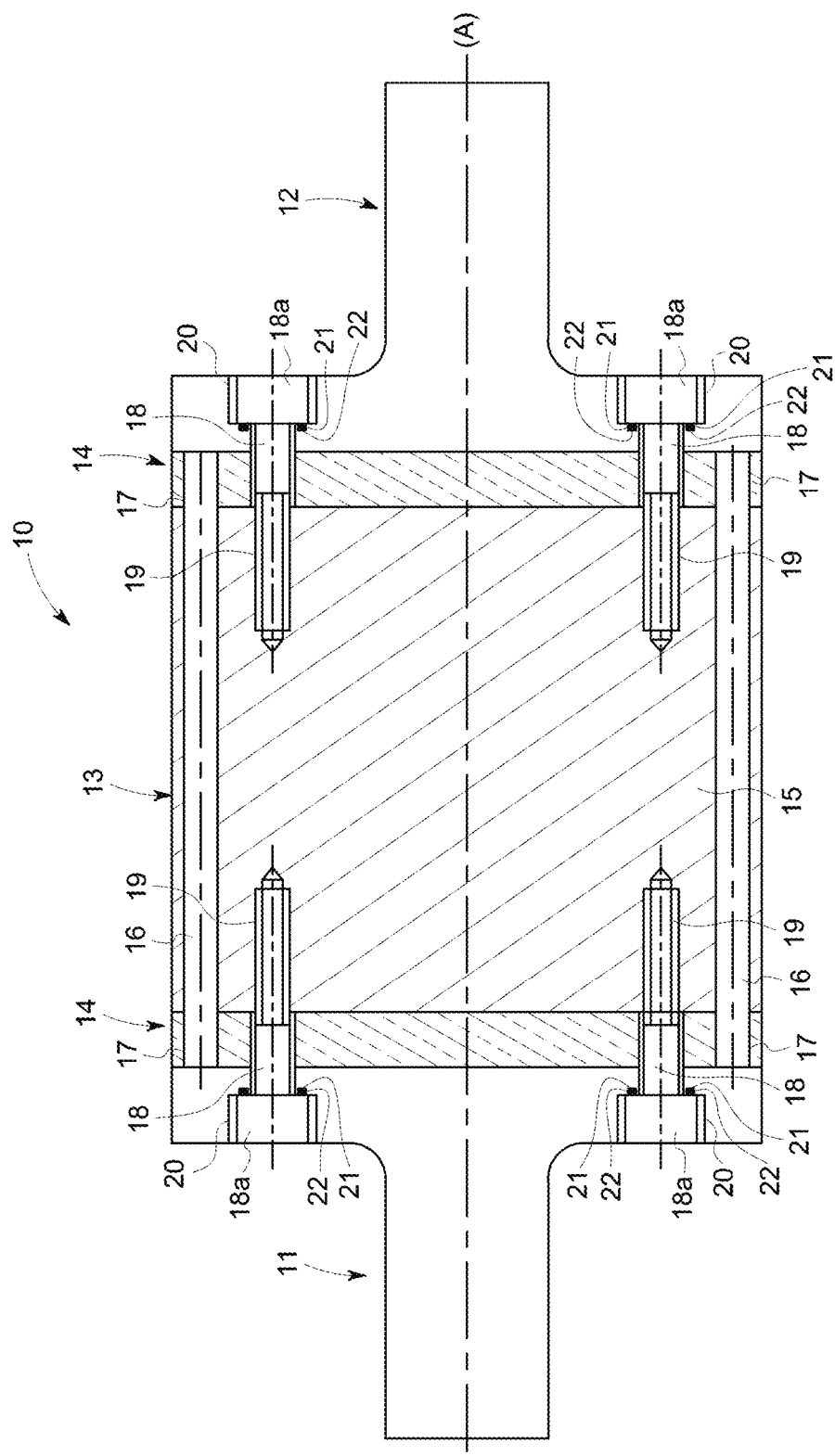
FIG. 3 illustrates a section along an axial direction of a first embodiment of the rotor.

As FIG. 3 shows, the rotor 10 comprises two half-shafts 11 and 12 holding tightly a cylindrical magnetic mass 13 and two short-circuit disks 14 each sandwiched between one half-shaft and one of the ends of the magnetic mass 13.

The magnetic mass 13 comprises a unitary metal body 15 comprising housings receiving conducting bars 16 distributed uniformly along a diameter of the unitary metal body 15.

The housings are sized to compensate for the expansion of the conducting bars 16 under the effect of the heat generated by the passage of current through the bars 16 during operation thereof and thus preventing a thermal-mechanical imbalance of the rotor caused by the expansion of the bars when they cannot expand freely, in particular in an axial direction.

The short-circuit disks 14 and the conducting bar 16 are, for example, made of copper and are electrically connected to each other to form a squirrel cage when the rotor is driven in a rotational movement.

The conducting bars 16 can be made of alloyed copper, aluminum, alloyed aluminum or any other electrically conducting material.

Each short-circuit disk 14 comprises through holes 17 in which the ends of each conducting bar 16 are respectively housed. Each conducting bar end goes into a hole 17 with radial play in order to compensate for the expansion of the conducting bars 16 under the effect of the heat generated by the passage of the current.

When the rotor 10 is driven in a movement of rotation at a speed of, for example, 30,000 RPM, the bars 16 are thrown towards the outside the magnetic mass 13 under the effect of the centrifugal force.

The bars 16 come into contact with the short-circuit disks 14, creating an electrical connection between the bars 16 and the short-circuit disks 14.

The conducting bars 16 are not directly in contact with the corrosive gas which could otherwise break down the conducting bars 16 which could for example lead to a bad electrical contact between the bars 16 and the short-circuit disks 14.

The rotor 10 further comprises screws 18 uniformly distributed along a diameter of each half-shaft 11 and 12.

Each screw 18 is engaged in threads 19 of the unitary metal body 15 so as to keep the short-circuit disks 14 and the unitary metal body 15 compacted between the half-shafts 11 and 12.

Each screw head 18a is housed in a counterbore 20 of the half-shaft 11 and 12.

Each counterbore 20 comprises a circular groove 21 at the bottom thereof wherein a seal 22 is arranged such that the gas cannot come into contact with the threads 19.

The seal 22 is preferably an O-ring, in a single piece without break or stubbing.

The circular groove 21 is smaller than the uncompressed seal 22, in particular the depth of the groove, such that when the seal 22 is compressed by tightening of the screws 18, the seal deforms providing thereby complete tightness despite roughness defects of the groove 21 or the head of the screw 18a which could leak under the pressure of the gas.

In that way, the gas is unlikely to damage the threading of the screw 18 and the threads 19 of the metal body 15.

Since the screwed connections are not damaged, a disassembly of the rotor is easier and there is no risk of the rotor 10 being disrupted by failure of the screwed connections.

Under the compacting force exerted by the screws 18, the surfaces of the short-circuit disks are deformed and provide a seal between the metal body 15 and the half-shafts 11 and 12.

Consequently, the half-shafts 11 and 12, the short-circuit disks 14 and the magnetic mass 13 form a tight envelope so as to prevent a gas from coming into contact with the conducting bars 16, the threads of the screws 18 and the threads 19 in the metal bodies 15.

Figure 4:
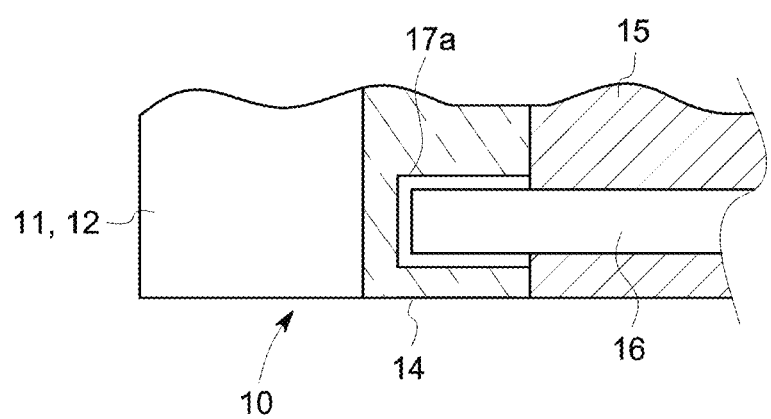
FIG. 4 illustrates a section along an axial direction of an embodiment of a short-circuit disk.

In a variant as shown in FIG. 4, the short-circuit disks 14 may comprise blind holes 17a in the place of through holes 17 from FIG. 3.

In this case, the ends of the conducting bars 16 are arranged with axial and radial play in the blind hole 17a allowing free expansion of the bars, in particular in the axial direction preventing a thermal-mechanical imbalance of the rotor caused by the bars.

According to other embodiments not shown, the metal body 15 may comprise on at least one end a circular groove comprising a seal so as to seal the contact between the metal body and the short-circuit disk. The surface of the half-shaft 11 and 12 in contact with the short-circuit disk 14 may comprise a circular groove comprising a seal so as to make the contact between the half-shaft 11 and 12 and the short-circuit disk 14 tight.

According to another embodiment not shown, the metal body 15 is made by assembly and compacting of several metal plates 23.

The plates are secured to each other by tie rods passing through them and connecting both end plates of the magnetic mass 13 or by screws immersed in the counterbores arranged so as to connect two plates adjacent to each other, where the metal body is attached by screws 18 to the half-shafts 11 and 12.

In the following, the elements identical to those previously described are identified by the same alphanumeric references.

Figure 5:
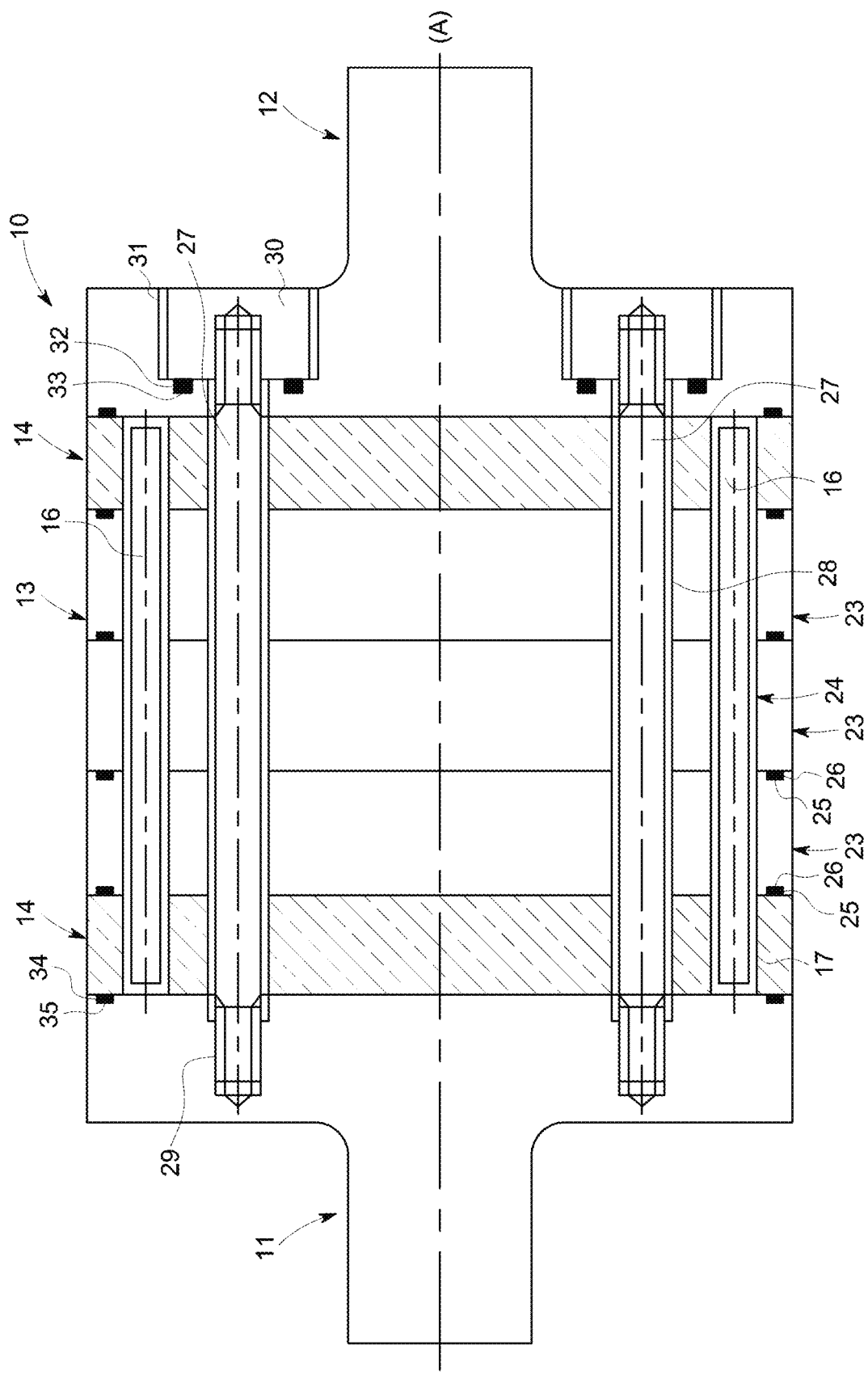
FIG. 5 illustrates a section along an axial direction of a second embodiment of the rotor.

Referring to FIG. 5, it illustrates a section along an axial direction of a second embodiment of the rotor 10.

The two half-shafts 11 and 12 tightly holding a cylindrical magnetic mass 13 and two short-circuit disks 14 each sandwiched between one half-shaft and one of the ends of the magnetic mass 13, and conducting bars 16 housed inside the magnetic mass can be seen.

The magnetic mass 13 comprises a stack of metal plates 23, for example steel, comprising housings 24 receiving conducting bars 16.

At least one surface of each metal plate 23 comprises at least one circular groove 25 in which a seal 26 is inserted so as to make the contact between the surfaces of the metal plates 23 in contact tight when they are compacted.

A metal plate 23 comprising a circular groove 25 comprising a seal 26 on each surface thereof alternates with a metal plate 23 not comprising a groove 25.

As a variant not shown, each metal plate 23 comprises at least one groove 25.

The rotor 10 further comprises tie rods 27 uniformly distributed along at least one diameter of the rotor 10 and inserted in the second housings 28 of the metal plates 23.

A first end of the tie rods 27 is engaged in a threaded blind hole 29 of the first half-shaft 11, and the second end of the tie rods is engaged with a cap nut 30 arranged in a counterbore 31 of the second half-shaft 12 so as to keep the metal plates 23 and the short-circuit disks 14 compacted between the half-shafts 11 and 12.

The second half-shaft 12 comprises at the bottom of the counterbore 31 a circular groove 32 in which is inserted the seal 33 compressed by the cap nut 30 such that gas does not come into contact with the tie rods 27.

The surface of the half-shaft 11 and 12 in contact with the short-circuit disk 14 may comprise a circular groove 34 comprising a seal 35 so as to make the contact between the half-shaft 11 and 12 and the short-circuit disk 14 tight.

Consequently, the half-shafts 11 and 12, the short-circuit disks 14 and the metal plates 23 form a tight envelope so as to prevent the gas from coming into contact with the conducting bars 16 and the tie rods 27.

In a variant not shown, the short-circuit disk 14 comprises at least one surface comprising a circular groove receiving a seal so as to make the contact between the plate 23 or the half-shaft 11, 12 and the short-circuit disk tight.

The short-circuit disk 14 may comprise a circular groove comprising a seal on each of the surfaces thereof.

According to other embodiments not shown, at least one half-shaft 11, 12, one short-circuit disk 14, the metal body 15 or one metal plate 23 comprises at least one surface comprising two or more substantially concentric circular grooves, where each groove comprises a seal and where the seals are the same or different kind, so as to form several tight barriers of the same or different kind for improving the seal of the rotor.

When the seals are different kind, the material for each seal is chosen such that each seal seals the rotor against one of the chemically aggressive components contained in the gas.

According to another embodiment not shown, at least one half-shaft 11, 12, one short-circuit disk 14, the metal body 15 or one metal plate 23 comprises at least one surface comprising at least one circular groove and a seal substantially concentric to the conducting bar 16, the tie rod 27, the threading 29 or the screw 18 so as to improve the seal and chemical protection of the bars, tie rods and screws. Preferably the seals are different kinds.

In the embodiments previously disclosed, the short-circuit disk 14 is in contact with the gas.

Figure 6:
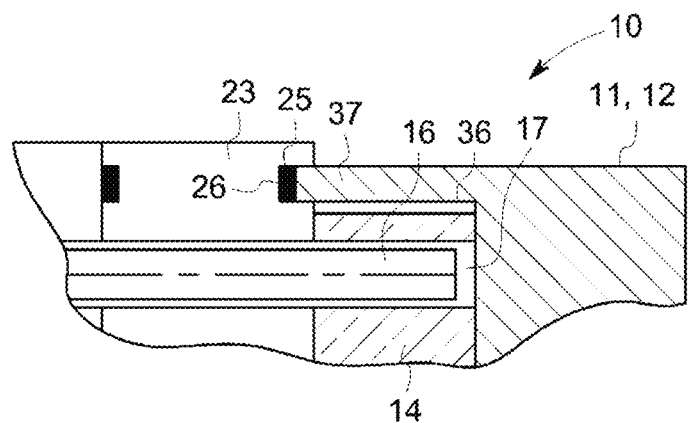
FIG. 6 illustrates a partial section along an axial direction of a third embodiment of the rotor.
Figure 7:
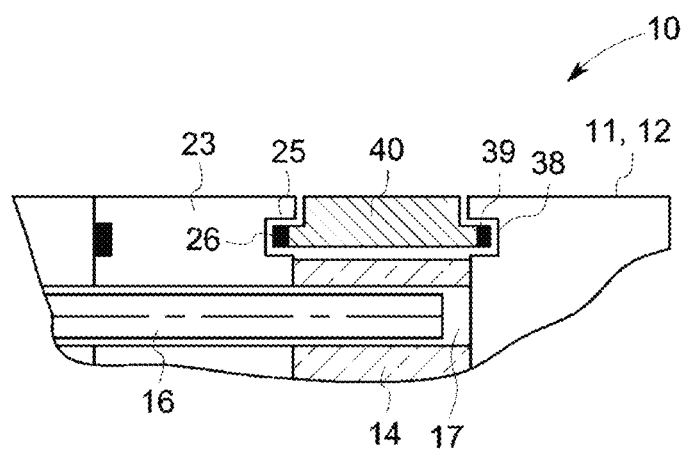
FIG. 7 illustrates a partial section along an axial direction of a fourth embodiment of the rotor.
Figure 8:
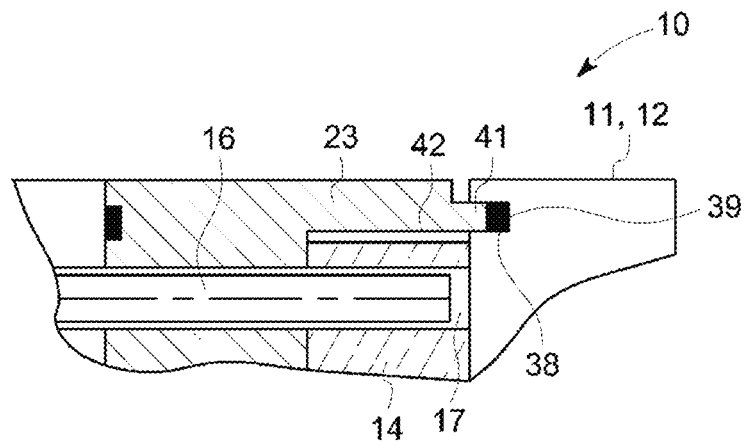
FIG. 8 illustrates a partial section along an axial direction of a fifth embodiment of the rotor.

Now referring to FIGS. 6, 7 and 8, they illustrate in a partial section along an axial direction of the rotor embodiments of a rotor 10 in which the short-circuit disk 14 is not in contact with the gas.

In a third embodiment of the rotor 10 shown in FIG. 6, the half-shaft 11, 12 comprises a circular counterbore 36.

The outer diameter of the short-circuit disk 14, the diameter of the counterbore 36 and the inner and outer diameters of the end 37 of the half-shaft 12 directed towards the metal plate 23 in order to compress the seal 26 are sized such that the short-circuit disk goes into the circular counterbore 36 and the end 37 of the half-shaft 12 goes into the circular groove 25 of the metal plates 23 such that the gas does not come into contact with the short-circuit disk 14.

In a variant not shown, only the end portion 37 going into the circular groove 25 comprises a smaller outer diameter than the outer diameter of the metal plate 23.

In a fourth embodiment of the rotor 10 visible in FIG. 7, the rotor 10 further comprises a crown 40, preferably of steel or stainless steel, and the half-shaft 11, 12 comprises on the surface in contact with the short-circuit disk 14 a circular groove 38 into which a seal 39 goes.

The crown 40, the circular groove 38 of the half-shaft 12 and the outer diameter of the short-circuit disk 14 are sized such that the short-circuit disk is covered by the crown 40 going into the circular groove 38 of the half-shaft 12 and into the circular groove 25 of the metal plate 23 comprising the seal 26 such that the seals 26 and 39 are compressed and that the gas does not come into contact with the short-circuit disk 14.

In a fifth embodiment of the rotor 10 shown in FIG. 8, the circular groove 38 in which the seal 39 is inserted is made in the surface of the half-shaft 11, 12 in contact with the short-circuit disk 14.

The metal plate 23 comprises a circular counterbore 42 on the surface in contact with the short-circuit disk 14.

The outer diameter of the short-circuit disk 14, the diameter of the counterbore 42 and the inner and outer diameters of the end 41 of the metal plate 23 directed towards the half-shaft 12 are sized such that the short-circuit disk goes into the circular counterbore 42 and the end 41 of the metal plates 23 goes into the circular groove 38 of the half-shaft 12 in order to compress the seal 39 and in order that the gas does not come into contact with the short-circuit disk 14.

In a variant not shown, the short-circuit disk 14 comprises a blind hole in place of the hole 17 such that there remains axial and radial play between the blind hole and the conducting bar 16 going into the blind hole.

The seals 22, 26, 33, 35, 39 may for example comprise an O-ring of stainless steel, polymer or metal, preferably a single piece without break or stubbing.

According to another embodiment, the outer surface of the rotor 10 comprises a coating comprising nickel, preferably comprising a NiCrAlY type alloy or a MCrAlY type alloy.

The coating may also comprise a PEEK or PEEK-based polymer.

The coating which protects the outer surface of the rotor 10 is thus not attacked by the aggressive chemical components contained in the gas.

The coating has a thickness from 0.1 mm to 0.5 mm, preferably 0.3 mm.

The coating is applied according to a well-known process.

Further, the coating fills the interstices in particular between the short-circuit disks 14 half-shafts 11 and 12, or between the metal plates 23, and also protects both the outer diameter of the rotor 10 and also the lateral surfaces thereof.

The rotor 10 is impermeable to the gas. The most fragile components of the rotor are not in contact with the gas.

During operation of the compressor group, the gas is not stored in the rotor 10.

Consequently, during startup and shutdown phases of the compressor group, the rotor does not experience violent depressurization phenomena, even if a very small volume of gas despite everything has managed to enter the rotor.

In variants not shown, the conducting bars 16 are rectangular, rectangular with rounded edges, or oblong.

According to other embodiments, the rotor comprises two or more rows of bars 16 arranged on two or more substantially concentric diameters, or two or more rows of tie rods 27 or screws 18 arranged on two or more substantially concentric diameters.

The material of the metal body 15, metal plates 23, crown 40 and half-shafts 11 and 12 is resistant to corrosion and to the aggressive components in the gas.

The material can comprise alloyed or martensitic steel, austenitic or martensitic stainless steel or even titanium.

What is claimed is:

1. A rotor for asynchronous rotating electrical machine comprising:
   a cylindrical magnetic mass;
   two short-circuit disks;
   a non-through shaft comprising two half-shafts holding tightly the cylindrical magnetic mass and the two short-circuit disks, each two short-circuit disks being sandwiched between the two half-shafts and one of the ends of the cylindrical magnetic mass; and
   conducting bars housed inside the cylindrical magnetic mass and distributed uniformly along at least one diameter of the magnetic mass,
   wherein the two short-circuit disks and the conducting bars form a squirrel cage and the two half-shafts, the two short-circuit disks and the magnetic mass form a gas-tight envelope, and wherein a surface of at least one half-shaft of the two half-shafts in contact with a short-circuit disk of the two short-circuit disks comprises a circular groove comprising a seal so as to form a tight contact between the at least one half-shaft and the short-circuit disk.

2. The rotor according to claim 1, wherein each end of the conducting bars is housed with play in a blind hole of a short-circuit disk.

3. The rotor according to claim 1, wherein each end of the conducting bars is housed with play in a through hole of a short-circuit disk.

4. The rotor according to claim 3, wherein the cylindrical magnetic mass comprises a unitary metal body comprising housings receiving the conducting bars.

5. The rotor according to claim 4, further comprising screws uniformly distributed along at least one diameter of the half-shaft, each screw being engaged in threads of the unitary metal body so as to keep the short-circuit disks and the unitary metal body compacted between the half-shafts, where each screw head is housed in a counterbore of the half-shaft comprising a circular groove at the bottom of the counterbore and where a seal is arranged in the circular groove such that the gas cannot come into contact with the threads.

6. The rotor according to claim 5, wherein at least one end of the metal body comprises a circular groove comprising a seal to form a tight contact between the metal body and the short-circuit disk.

7. The rotor according to claim 3, wherein the cylindrical magnetic mass comprises a stack of metal plates comprising housings receiving the conducting bars, where at least one surface of each metal plate comprises a circular groove comprising a seal so as to form a tight contact between the surfaces of the metal plates in contact.

8. The rotor according to claim 7, further comprising tie rods uniformly distributed along at least one diameter of the rotor where the tie rods are inserted in the second housings of the metal plates, where a first end of the tie rods is engaged in a threaded blind hole of the first half-shaft and the second end of the tie rods is engaged with a cap nut arranged in a counterbore of the second half-shaft, where the second half-shaft comprises at the bottom of the counterbore a circular groove comprising a seal so as to keep the metal plates and the short-circuit disks compacted between the half-shafts and such that gas cannot come into contact with the tie rod.

9. The rotor according to claim 8, wherein at least one half-shaft comprises a circular counterbore, where the outer diameter of the short-circuit disk, the diameter of the counterbore and the inner and outer diameters of the end of the half-shaft directed towards the metal plate are sized such that the short-circuit disk goes into the circular counterbore and the end of the half-shaft goes into the circular groove of the metal plate such that the seal is compressed and the gas does not come into contact with the short-circuit disk.

10. The rotor according to claim 8, further comprising a crown, where at least one half-shaft comprises a circular groove comprising a seal on the surface thereof in contact with the short-circuit disk, where the crown, circular groove of the half-shaft and the outer diameter of the short-circuit disk are sized such that the short-circuit disk goes into the circular groove of the half-shaft and into the circular groove of the metal plate comprising a seal such that the seals and are compressed and that the gas does not come into contact with the short-circuit disk.

11. The rotor according to one claim 8, wherein at least one half-shaft comprises a circular groove comprising a seal on the surface in contact with the short-circuit disk, where the metal plate comprises a circular counterbore on the surface in contact with the short-circuit disk, where the outer diameter of the short-circuit disk, the diameter of the counterbore and the inner and outer diameter of the end of the metal plate directed towards the half-shaft are sized such that the short-circuit disk goes into the circular counterbore and the end of the metal plate goes into the circular groove of the half-shaft such that the seal is compressed and that the gas does not come into contact with the short-circuit disk.

12. The rotor according to claim 11, wherein the seal comprises an O-ring of stainless steel, polymer or metal, preferably a single piece without break or stubbing.

13. The rotor according to claim 12, wherein the outer surface of the rotor comprises a coating comprising nickel or comprising a NiCrAlY type alloy or a MCrAlY type alloy or comprising a PEEK or PEEK-based polymer.

14. The rotor according to claim 13, wherein the metal body, the metal plates, the crown, or the half-shafts comprise alloyed or martensitic steel, austenitic or martensitic stainless steel or even titanium.

15. The rotor according to claim 14, wherein at least one short-circuit disk comprises at least one surface comprising a circular groove receiving a seal so as to make the contact between the plate or the half-shaft and the short-circuit disk tight.

16. The rotor according to claim 15, wherein at least one half-shaft, one short-circuit disk, the metal body or one metal plate comprises at least one surface comprising two or more substantially concentric circular grooves, where each groove comprises a seal and where the seals are the same or different kind, so as to form several tight barriers of the same or different kind for improving the seal of the rotor.

17. The rotor according to claim 15, wherein at least one half-shaft, one short-circuit disk, the metal body or one metal plate comprises at least one surface comprising at least one circular groove and a seal substantially concentric to the conducting bar, the tie rod, the threading or the screw so as to improve the seal and chemical protection of the bars, tie rods and screws.

* * * * *